United States Patent [19]
Kohler et al.

[11] Patent Number: 5,208,890
[45] Date of Patent: May 4, 1993

[54] REFRACTORY-BONDED GLASS FIBERS

[75] Inventors: Matthias Kohler, Bad Schwalbach; Rudolf Wolter, Mainz, both of Fed. Rep. of Germany

[73] Assignee: Schott Glaswerke, Mainz, Fed. Rep. of Germany

[21] Appl. No.: 828,665

[22] Filed: Feb. 6, 1992

[30] Foreign Application Priority Data

Feb. 7, 1991 [DE] Fed. Rep. of Germany ....... 4103641

[51] Int. Cl.$^5$ ............................................. G02B 6/04
[52] U.S. Cl. .................................... 385/115; 385/120
[58] Field of Search ................................ 385/115, 120

[56] References Cited

U.S. PATENT DOCUMENTS

3,681,164  8/1972  Bazinet, Jr. et al. ................ 156/294
5,046,816  9/1991  Lehmann et al. ................... 385/115
5,061,035  10/1991  Rogers, Jr. ......................... 385/115

Primary Examiner—John D. Lee
Assistant Examiner—S. W. Barns
Attorney, Agent, or Firm—Millen, White, Zelano & Branigan

[57] ABSTRACT

High-temperature resistant fiber optic units are produced by coating individual glass fibers, either individually or in a bundle of fibers and with or without encasing the coated fiber or fiber with a sheath or sleeve, a liquid silica sol bonding agent which optionally contains an inorganic filler and then hardening the coated fiber, bundle of fibers or a plurality of the bundles with heat or under vacuum, to produce a fiber optic unit which can be stressed at temperatures of up to about 600° C.

22 Claims, 6 Drawing Sheets

REFRACTORY-BONDED GLASS FIBERS

BACKGROUND OF THE INVENTION

The present invention relates to a glass fiber optic unit and to a process for the production thereof.

Fiber optic units consist of one or several light waveguides bonded to one another and/or to a sleeve at their ends. Light waveguides are customarily glass fibers exhibiting a higher index of refraction in their interior than in their external glass region. Fiber optic units are utilized in many areas of technology as probes or lightguides for the transmission of optical measuring signals, for example in the fields of pyrometry, measuring signal processing in high-temperature chambers, or light transmission of a light of high power density from high-power light sources.

German Patent 3,744,367 concerns the production of fiber optic units, especially fiber optic conductor bundles. The production of a fiber optic unit which is heat-resistant up to about 350° C. is accomplished by means of a press die, a glass ring, and a sleeve which are arranged over a region of a lightguide fiber bundle, after heating the fiber bundle substantially in the zone of the glass ring, then press-bonding same and allow it to cool, using a sleeve material which is not wetted by the heated glass of the ring. After cooling, at least the sleeve and optionally the die are again removed from the lightguide, in contrast to German Patent 3,247,500 which likewise describes a method for the manufacture of lightguides that are heat-resistant up to about 300° C. but wherein the sleeve and die must remain on the prepared lightguide end, which is a disadvantage.

DOS 3,822,885 concerns optical fiber bundles for endoscopes or the like with a plurality of optical fibers joined on both ends but wherein individual fibers are freely movable within the central section of the bundle, which is encompassed by a flexible tube, for example of polyurethane. In order to avoid breakage of fibers, the flexible tube is filled, in the proximity of the ends, for example with liquid silicone, powdered molybdenum sulfide, or boron nitride. The fiber end zones, however, are connected at each end with a conventional metallic cap which disadvantageously also remains on the finished fiber bundle.

In order to couple in a high power density light into the ground and polished ends of the fiber optic unit, it is necessary for the connection of the glass fibers with one another and/or with the sleeve to be high-temperature refractory (T >350° C.) since, on the one hand, not all light can be coupled into the light waveguides so that a portion of the light also impinges on the junction points between the glass fibers and/or between the glass fiber(s) and the sleeve, thus heating this junction and, on the other hand, the field of usage of the fiber optic unit may make such a high-temperature resistance necessary.

Besides a sleeve, an adhesive is customarily if used in the preparation of fiber optic units. However, the organic adhesives, e.g., epoxy resins or polyimides, heretofore usually employed for joining glass fibers are temperature-resistant at most only to 280° C. Consequently, organic adhesives are damaged when the fiber optic unit is used with a light of high power density. During such use, the adhesive evaporates and can precipitate on the end face of the glass fibers in the form of an interfering film, or it can burn up directly. Either result leads to uselessness and destruction of the entire fiber optic unit. Furthermore, the organic adhesives do not reflect light and, as a result, the heat stress on the adhesive is still further increased.

When using cements as bonding agents for the aforementioned purpose, a strong heating effect is likewise encountered for the additional reason that the light is not reflected by the bonding agent. Also, since these cements cannot be adapted with respect to their thermal expansion properties to the glass fibers, stresses can occur upon heating of the fiber optic unit that can lead to destruction of the fiber optic unit just as can happen by a temperature gradient developing due to differing heating up rates of the individual components.

The primary drawback in using a water glass composition as a bonding agent is the lack of resistance of the bond produced therefrom to the effect of moisture. There is a danger of redissolution of the water glass composition upon contact of the fiber optic unit with water and, as a consequence, the possible destruction of the fiber optic unit, for example when using the fiber optic unit in medical technology (cleaning, sterilization, etc.).

It is an object of the present invention to provide fiber optic units of the type discussed hereinabove which can be used under high power densities loads.

It is another object to provide a simple and inexpensive manufacturing method for producing such fiber optic units.

Other objects will be apparent to those skilled in the art to which this invention pertains.

SUMMARY OF THE INVENTION

These objects are attained according to this invention by employing as the bonding agent a crystallized or amorphous solid silica sol or a mixture of a crystallized or amorphous solid silica sol and an inorganic filler.

In one article of manufacture aspect, this invention relates to a fiber optic unit comprising a bundle of a plurality of glass fibers with the cavities therebetween filled with a water insoluble bonding agent, which bonding agent is crystallized or amorphous $SiO_2$ precipitated from a solid silica sol having an $SiO_2$ to alkali molar ratio content, calculated as $SiO_2$ and $R_2O$ wherein R is an alkali metal, of less than 15:1.

In another article of manufacture aspect, this invention relates to a fiber optic unit comprising at least one glass fiber bonded to a sleeve surrounding the fiber by a layer means of a water insoluble crystalline or amorphous $SiO_2$ bonding agent precipitated from a solid silica sol having an $SiO_2$ to alkali molar ratio content, calculated as $SiO_2:R_2O$ wherein R is an alkali metal of less than 15:1.

In a process aspect, this invention relates to a process for the production of a fiber optic coating the external surface of a plurality of glass fibers with a liquid filler containing silica sol bonding agent containing a liquid component, either before or after forming the glass fibers into a bundle, and then hardening the bonding agent on the glass fibers to a solid state in the bundle.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIGS. 4*1* and 4*b* show, respectively in cross section, a view in the proximity of the end face zone of a fiber optic unit with a fiber bundle of glued-together fibers (4*a*) and, respectively, of hot-melt bonded fibers (4*b*) glued within a sleeve;

DETAILED DISCUSSION OF THE DRAWINGS

Figure 3:
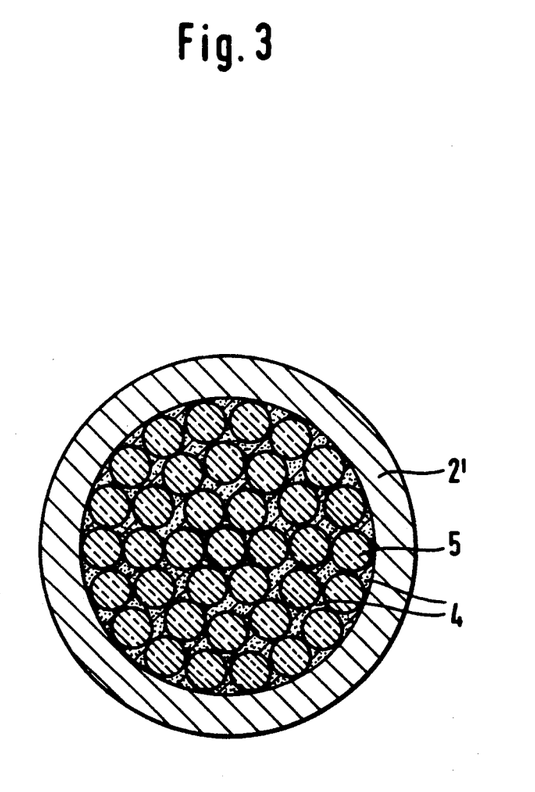
FIG. 3 is a cross-sectional view in the proximity of the end face zone of a fiber optic unit with a fiber bundle wherein joining of the individual fibers and fixation in the sleeve have taken place in one operating step.

FIG. 3 shows a cross-section in the proximity of the end face zone of a fiber optic unit with a plurality of fibers 5 joined in a single working step to each other by a bonding agent 4 of this invention and simultaneously fixed in place in a sheath material 2'. In this arrangement, it is especially advantageous that the manufacture of the fiber bundle, bonded within an envelope, is conducted in a single working step.

Figure 4A:
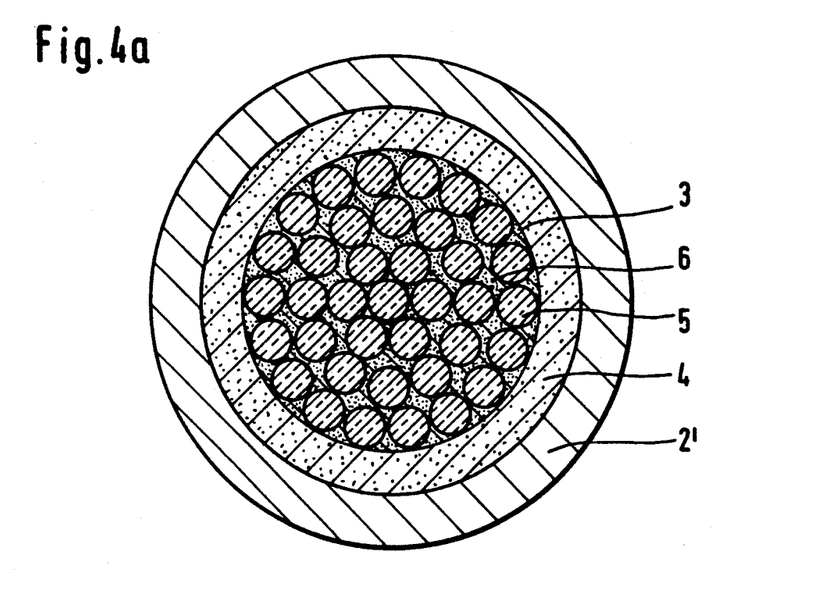
Figure 4B:
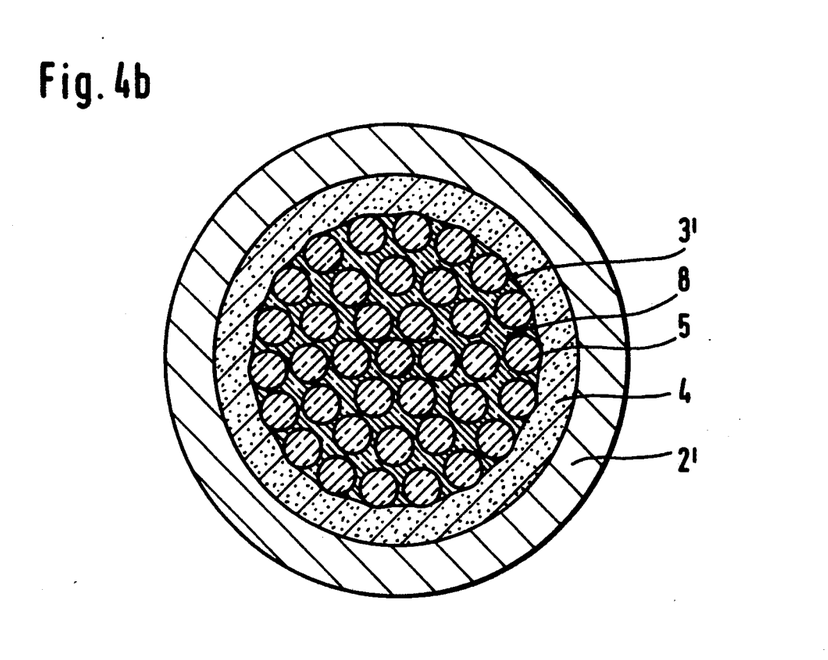

FIGS. 4*a* and 4*b* show analogous units, except that here either a glued-together fiber bundle 3, made up of a plurality of individual fibers 5, bonded with a hardened crystallized silica sol 6, or a hot-melt bonded fiber bundle 3', made up of a plurality of individual fibers 5, wherein the individual fibers are joined together by regions 8 that have melted one into the other, is glued, in a second working step, into a suitable sleeve 2', in each case with adapted silica sol 4.

Figure 5:
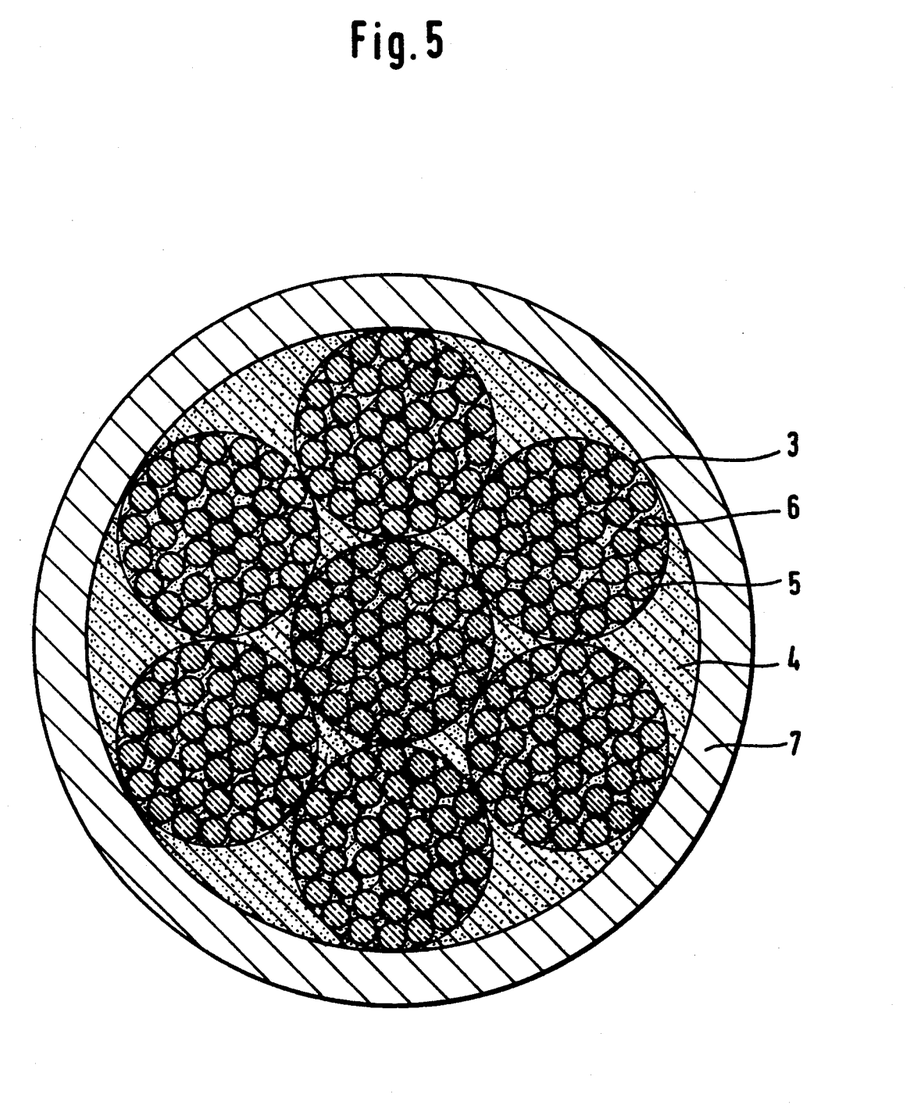
FIG. 5 shows a cross-section in the proximity of the end face zone of a fiber optic unit with a plurality of glued-together, uncovered fiber bundles within a sheath material.

FIG. 5 shows a plurality of glued-together fiber bundles 3, made up of a plurality of individual fibers 5, bonded with a hardened crystallized filled silica sol 6 of this invention, joined within a sheath material 7 by means of an adapted silica sol 4. In this arrangement, the external shape of the fiber optic unit is determined by the sheath material selected.

Figure 6:
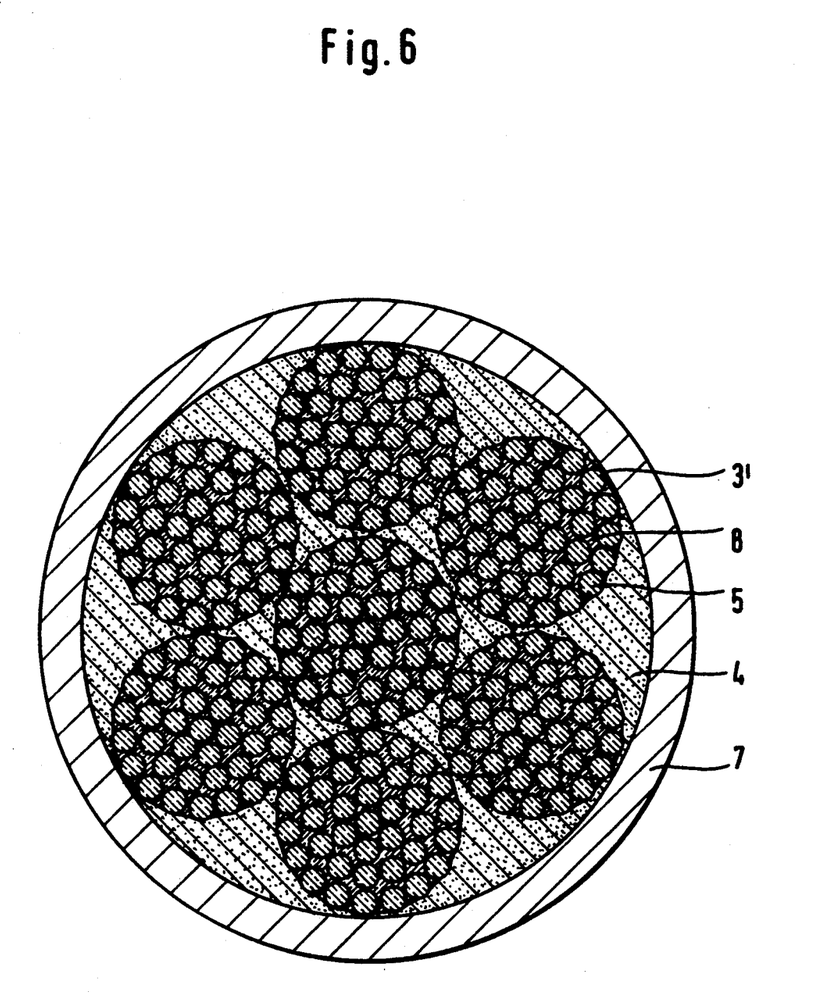
FIG. 6 shows a cross-section in the proximity of the end face zone of a fiber optic unit with a plurality of hot-melt bonded, uncovered fiber bundles within a sheath material.

FIG. 6 shows an analogous unit which differs from the unit shown in FIG. 3 by the feature that hot-melt bonded fiber bundles 3', wherein the individual fibers are joined by regions 8 that have been melted together, are glued together to form a fiber optic unit.

Figure 7:
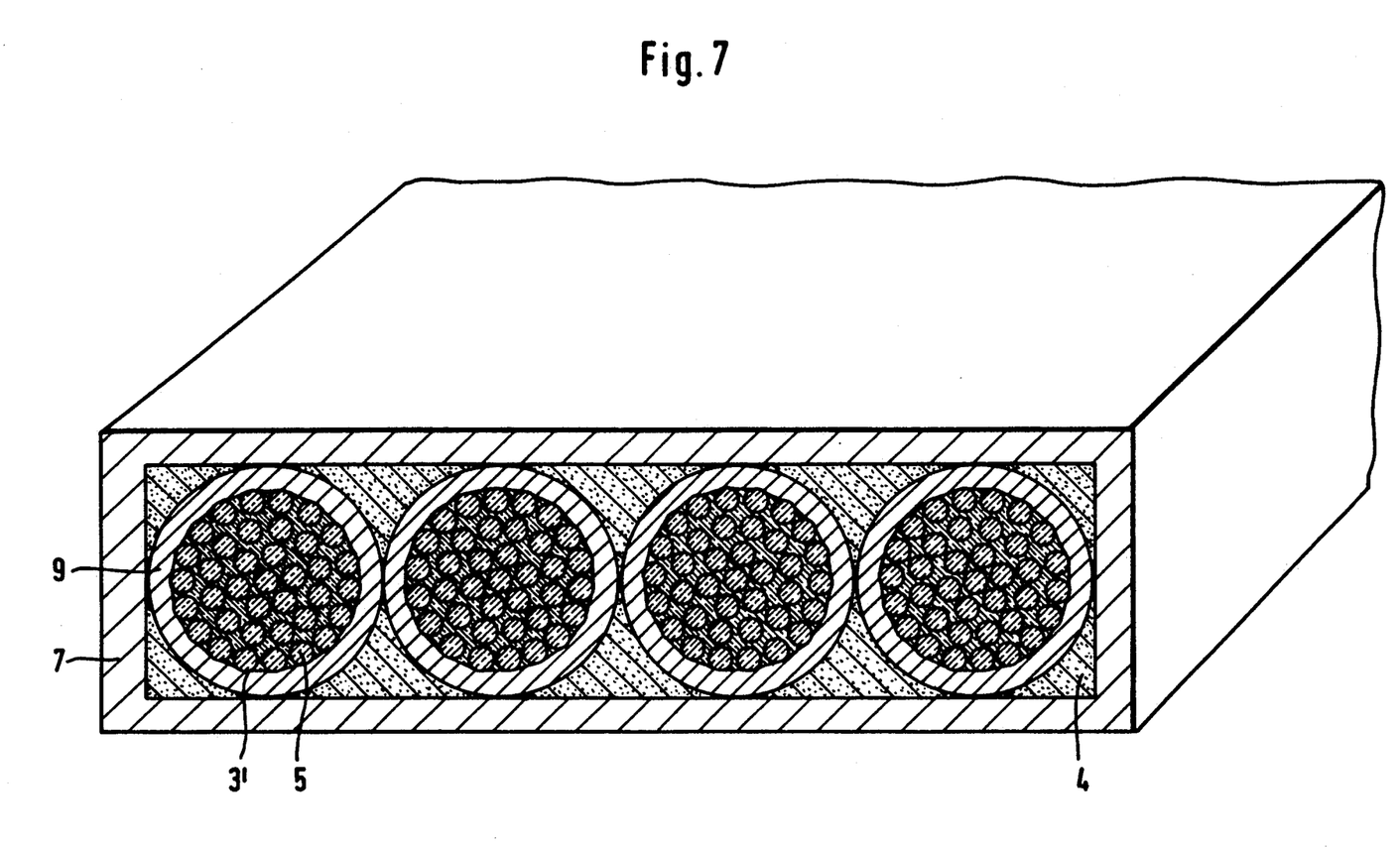
FIG. 7 shows a cross-section in the proximity of the end face zone of a noncircular lightguide with a plurality of enveloped, hot-melt bonded fiber bundles in a sheath material.

In FIG. 7, another embodiment of a fiber optic unit of this invention is illustrated. Hot-melt bonded fiber bundles 3' with a sheath material 9 are arranged in parallel side-by-side relationship and are bonded together with hardened silica sol bonding agent within a suitable sheath material 7.

DETAILED DISCLOSURE

Employing a silica sol as the bonding agent permits the fixation of the glass in a way which permits their fibers being coupled at high power densities, and their use as lightguides in a high-temperature environment up to about 600° C. where this temperature orientation depends primarily on the strength of the total system.

The silica sols utilized in accordance with this invention are liquid, usually aqueous, colloidal dispersions of amorphous silicon dioxide ($SiO_2$) particles. In contradistinction to silica in water glass, which is in the form of a solution on an alkali metal salt thereof, the silicon dioxide is present in the form of mutually noncrosslinked, individual spherical particles which are hydroxylated on their surface. The particles advantageously have no internal porosity and exhibit a size range in the colloidal range of between about 5 and 150 nm.

Silica sols are homogeneous, low-viscosity liquids which are not subject to separation and, depending on the type, are colorless-transparent, opalescent in the blue color range, or milky-turbid.

The commercially available products are stable with respect to irreversible gelation to a silica gel and contain varying amounts of alkali for stabilization. However, stabilization can be achieved equally well with small amounts of ammonia so that alkali-free silica sols can also be utilized. The low alkali or ammonia contents in the silica sol achieve a pH value of between about 9 and about 11. Above a pH of about 11, peptization occurs to an increasing extent with the formation of a solution of an alkali silicate (water glass) rather than a colloidal dispersion of $SiO_2$ particles.

Except when alkali-free, ammonia-stabilized silica sols are employed, the silica sols employed in the present invention, contain alkali, e.g., in a molar ratio of $SiO_2:R_2O$ wherein R is an alkali metal, of about 15:1 or less, e.g., in a molar ratio of $SiO_2:R_2O$ of between about 15:1 and about 200:1, preferably about 60:1 to about 130:1.

The alkali metal of the alkali used to form the silica sol is preferably Na.

The particle size of the silica as well as the alkali content of the sol distinguishes the silica sols employed according to this invention from the water glass compositions known in the prior art as bonding agents, i.e., the spherical $SiO_2$ particles having diameters between about 5 and 150 nm which are characteristic of the silica sols employed in this invention are lacking in water glass. Moreover, the commercially utilized water glass compositions have an $SiO_2:R_2O$ ratio of about between 2:1 to about 4:1, i.e., they exhibit a much higher alkali content than the silica sols utilized according to this invention. This high alkali content is responsible for the moisture sensitivity of a bond created by such water glasses and leads to the redissolution of hardened water glass compositions upon contact with water.

An essential criterion for the usability of the silica sols is their specific aggregate state in a liquid, usually aqueous, colloidal dispersion. As already discussed hereinabove, this distinguishes the silica sols employed in this invention from silica gels, highly dispersed silicic acids, silicic acid fillers and alkali silicate solutions.

Silica sols suspended in an organic fluid can likewise be utilized with advantage. Such silica sols can be prepared, for example, by hydrolyzing a solution of silicon tetraalcoholates in alcohol or ether to the sol by the addition of a small amount of water. Such "organic"

silica sols can be dried in an especially satisfactory way and in dimensionally stable form, i.e., with low shrinkage. Since alcohols are utilized as the preferred fluid, these sols or gels, respectively, are known generally as alcogels.

A characteristic of the bonding agents according to this invention is that the silica sol, used to produce them, although initially in the form of a colloidal solution, are present after application as the bonding agent of the fiber optic units of this invention in the form of solid, crystallized or amorphous, water-insoluble silicon dioxide.

The liquid form of the bonding agent used to produce the fiber optic units according to this invention is advantageous for the manufacture of fiber optic units since this ensures the cavities extending in the longitudinal direction between the individual lightguide fibers (gussets) and/or between the lightguide fiber(s) and the sleeve material, are filled with the bonding agent, which is absolutely required for a dimensionally stable bond in the production of the fiber optic units.

In general, $SiO_2$ concentrations of at least 10% by weight in the silica sol are employed, with concentrations of 30–40% by weight being preferred. Concentrations below 10% by weight are also usable in some instance and concentrations far above 40% by weight can be used but are not available commercially.

It is possible to adapt the physical properties of the crystallized bonding agent to those of the glass fibers to be bonded together therewith or to the fiber optic units by the prior introduction into the liquid bonding agent of an inert ordinarily inorganic filler, such as, for example, ground borosilicate glass, ground quartz glass, aluminum oxide, ground glass ceramic, or a mixture of two or more of these materials, in a weight proportion of between about 0.5 to about five parts of filler per one part of bonding agent (sol), preferably between about one and about two parts of filler per one part of bonding agent and preferably in weight ratio of filler to $SiO_2$ of at least 1:1, e.g., 1:1 to 24:1, preferably 1.9:1 to 9:1. The essential properties that can be modified by the filler are thermal expansion rate and processability.

The integral average values of the linear expansion coefficients of about 20° C. to about 300° C. of crystallized silica sol and of quartz glass are approximately identical, viz., about $0.59 \times 10^{-6} K^{-1}$.

The customarily used glass fibers (unless quartz fibers are employed) typically have linear expansion coefficients of about $8 \times 10^{-6}$ to $10 \times 10^{-6} K^{-1}$. A composite of individual components with adapted expansion coefficients is obtained by filling the bonding agent with ground glass of a similar linear expansion coefficient ($\alpha$) and using a sleeve having a similar expansion coefficient (for example, X22 CrNi 17, $\alpha = 10 \times 10^{-6} K^{-1}$). In the case of such a composite, thermally induced mechanical stresses build up to a far lesser extent.

Quartz or ground quartz glass is advantageously utilized in the case of quartz glass fibers which are to be attached in a quartz glass tube. Here also a composite results made up of individual components with adapted thermal expansion coefficients.

If, for any reason a composite is to be formed from components with relatively differing thermal expansion, choosing a bonding agent with filler according to this invention with a linear expansion coefficient for the filler that is approximately in the middle of those of the two unequal components can provide an effective compensation. For example, when a quartz glass fiber is mounted to a metallic sleeve of X22 CrNi 17 ($\alpha = 10 \times 10^{-6} K^{-1}$) compensation of the discrepancy in linear expansion coefficients ($\alpha$) can be achieved with a silica sol filled with an industrial glass having a linear expansion coefficient of $5 \times 10^{-6} K^{-1}$.

As set forth above, there is a marked difference in the composition of the silica sol between the mixing step prior to hardening and thereafter, since practically all of the fluid in the sol escapes during the hardening step. A relatively small proportion of silicon dioxide is present in the hardened solid material, so that the filler more than the silica determines the thermal expansion properties to a predominant degree.

By mixing about 1 part by weight of 40% by weight silica sol with 1.5 parts by weight of filler, the final hardened (dried) material contains only about 12% by weight of silicon dioxide stemming from the silica sol. When using a preferred mixture of 1 part of silica sol having a 30% to 40% $SiO_2$ content with 1 to 3 parts by weight of filler, $SiO_2$ concentrations in the hardened bonding agent stemming from the silica sol of 9-28% by weight are obtained.

As mentioned above, besides the thermal expansion, processability can likewise be adapted by the filler. The term "processability" as thus used means all those properties of significance in the manufacture of fiber optic units, e.g., the consistency or viscosity of the non-hardened bonding agent and particle distribution of the filler therein.

The grain size of the fillers can have an effect on the quality of the optical processing. Grain sizes should be used which still produce perfect surfaces during processing. Satisfactory results were achieved with fillers in which 99% of the grains were smaller than 40 $\mu m$, although grain size of 100 $\mu m$ also yielded useful results.

The fillers have an advantageous effect on the fiber optic units of this invention not only due to their adaptability but also by increasing the solids content of the silica sol processability of the silica sol with the glass fibers is improved. Too low a solids content in the bonding agent often results in too weak a bond of the fibers to one another and/or with a sleeve or sheath. In view of this fact, the addition of filler to the bonding agent is preferred.

After the individual fibers or the fiber optic units in the desired form have been brought into contact with a silica sol bonding agent adapted thereto, it is necessary to remove the carrier liquid from the latter, i.e., the water or organic liquid contained in the bonding agent, for producing the dimensionally stable, refractory-bonded fiber optic units. The spherical polycrystalline silicic acid particles contained in the silica sol tend, upon removal of the liquid, to crystallize or to solidify in amorphous fashion, and thereby harden the structure.

In principle, various possibilities exist for the removal of the carrier liquid, i.e., the water or the organic fluid. Drying can be accomplished by elevating the temperature or by the application of a vacuum. The removal of liquid can also be achieved with radiant energy, especially microwave energy. If the boiling point of the silica sol is exceeded, the bonding agent will froth which, depending on the application, can be an intentional unintended phenomenon. It is preferred in case of the alcogels and/or the sols in an organic fluid to remove the fluid in the supercritical state. Removing the fluid in this manner is well-known with the alcogels and leads to solid amorphous silicate aerogels which are transparent in spite of high porosity. Removal of the fluid in a super-critical condition has the advantage, in particular, that no shrinkage whatever of the $SiO_2$ bonding agent occurs during removal of the liquid. Water also can be removed from the sol while the supercritical state, although high pressures and relatively high temperatures are needed for attaining the supercritical condition. However, it is known that a fluid can be removed from items in an atmosphere of supercritical carbon dioxide. During removal of the $CO_2$, the fluid will likewise escape, so that the process can be performed at substantially lower temperatures. the production of such aerogels is described in detail in "Aerogels", Proceedings of the First International Symposium on Aerogels, Wuerzburg, September 1985, Editor J. Fricke, Springer Publishers, Heidelberg 1986.

Once all of the moisture has been removed in one of the above described ways, the silica sol will solidify irreversibly without chemically reacting with the glass fiber. The fixative effect of the crystallized or amorphous solid silica sol thus is based not only on adhesive or wetting properties relative to the glass materials of the fiber optic units but essentially also on a satisfactory filling of the spaces between the individual fibers and/or the fibers and the sleeve material.

After the drying and hardening of the bonding agent, the fiber optic units, which are now bonded in a high-temperature resistant fashion and in a dimensionally stable manner, are ready for further processing. When a plurality of fibers have been bonded together into a bundle of fibers by the bonding agent or one fiber or a plurality of fibers has been bonded to a sleeve or in a housing, then preparation of the ends of the fibers, e.g., grinding and polishing of the fiber ends usually follows.

This can be accomplished without danger of destruction of the fiber optic units manufactured with the use of the bonding agents of this invention. By fixing the fibers in place with the bonding agent, displacement of the fiber ends during end finishing is impossible. Moreover, any water utilized during the grinding and polishing step cannot attack the bonding agent.

In accordance with a further embodiment of the invention, the refractory bonding into larger units of previously finished fiber optic units, which can consist of hot-melt end-bonded glass fibers formed into bundles according to the process of this invention or according to the state of the art, can also be conducted. For this purpose, the already joined fiber bundles are introduced, in the desired arrangement, into a suitable enveloping material which determines the desired over-all external shape and then the high-temperature refractory bond into the larger unit is achieved with a bonding agent in accordance with this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited herein and of corresponding application Federal Republic of Germany P 41 03 641.751 filed Feb. 7, 1991, are hereby incorporated by reference.

EXAMPLES

The following are examples of the procedures for the production of a refractory-bonded fiber optic unit with a plurality of glass fibers of quartz glass bonded with a bonding agent produced from a mixture of silica sol and filler.

One part by weight of silica sol with a solids content of about 30% by weight (determined as annealing residue), an alkali content (calculated as $Na_2O$ and determined by titration) of about 0.35% by weight, a pH of about 9.8, a density of 1.21 $g/cm^3$, a viscosity, determined by means of a falling-ball viscometer, of 3 to 6 mPa·s, a specific surface area of about 300 $m^2/g$ determined according to Brunauer, Emmett and Teller, and a particle size of 7 to 8 nm, is stirred into a liquid or pasty-liquid consistency with 1.5 parts by weight of powdered quartz glass having a particle size distribution in which 99% of the particles have a diameter smaller than 40 $\mu m$ and 50% of the particles have a diameter smaller than 8 $\mu m$.

In another example according to this invention, one part by weight of silica sol with a solids content of about 40% by weight, an alkali content (calculated as $Na_2O$) of about 0.4% by weight, a pH of about 10.0, a density of 1.29 $g/m^3$, a viscosity of about 7-10 mPa·s, a specific surface area of about 200 $m^2/g$, and a particle size of 15-20 nm is combined with 3 parts by weight of an industrial ground glass having a thermal linear expansion coefficient $\alpha = 5 \cdot 10^{-6} K^{-1}$ as the solid matter and having a grain size distribution wherein 99% of the particles have a diameter smaller than 60 $\mu m$, in order to bond a bundle of the fibers together.

In still another example according to this invention, one part by weight of silica sol with a solids content of about 30% by weight, stabilized with ammonia, with a pH of about 9.1, a density of about 1.20 $g/m^3$, a viscosity of about 3-4 mPa.s, a specific surface area of about 200 $m^2/g$, and a particle size of 15-20 nm is utilized, with 1.9 parts by weight of the above-mentioned industrial ground glass, to bond a bundle of the fiber together.

After the bonding agents have been stirred into a batch, the further processing in the aforementioned examples takes place in a conventional fashion.

Figure 1:
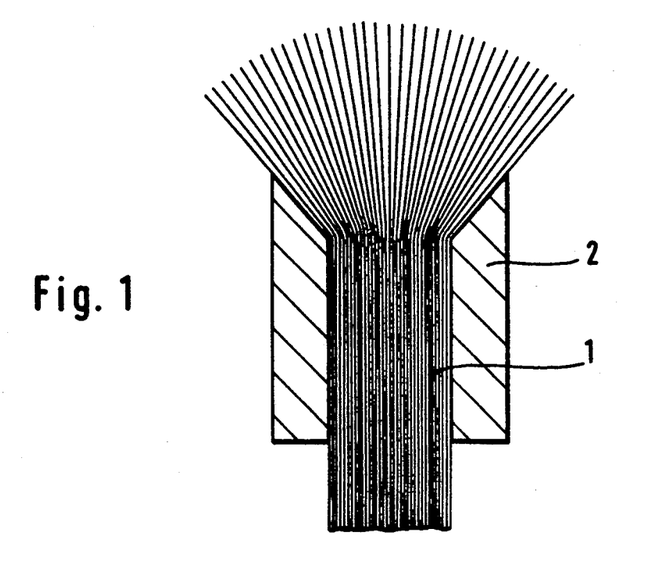
FIG. 1 shows a section in the longitudinal direction through a fiber bundle fanned open in the end face region of the individual fibers, with a sleeve attached below the fan.

The stirred batch of bonding agent is then brought into intimate contact with the end zone of the glass fibers, in a fiber bundle 1, fanned open in the zone of the ends, as illustrated in FIG. 1, fixed in place with a retracted movable sleeve of glass, or a retracted movable copper ring 2, so that all of the fibers are wetted all around with the bonding agent and all cavities are filled up therewith. The penetration depth of the bonding agent into the gussets between the individual fibers corresponds approximately to the distance between the fiber ends and the retracted sleeve.

Figure 2:
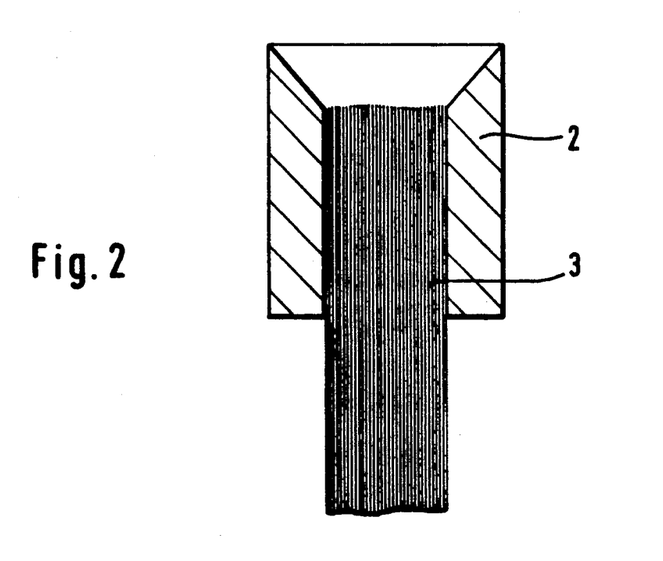
FIG. 2 shows a section in the longitudinal direction through a fiber bundle joined in the end face zone of the individual fibers, with a sleeve fixing the end face zone in place.

After the wetting and filling procedure, the retracted sleeve is repositioned into the starting condition, as illustrated in FIG. 2, so that the end zone 3 that has been brought into contact with the bonding agent is entirely surrounded by the sleeve. In this connection, special care must be taken that the positioning takes place before too much solvent has vaporized from the fanned bundle since otherwise the retracted sleeve can be moved back onto a thus-presolidified fan-shaped bundle only at risk of deformation of the fibers in the fan-shaped bundle. However, this does not create an especially time-critical process since several minutes are available for the positioning step, depending on temperature and pressure.

The drying step is performed well below the boiling temperature of the bonding agent, viz., at about 70° C. for 24 hours. This is done in an oven or at a correspondingly lower temperature in a vacuum drying cabinet. The use of microwave energy is particularly preferred for the drying procedure since in such a case heat is generated only where there is moisture (water). This is especially advantageous since no heat conduction is required.

If it is desired to create frothing in the zone of the ends, for example because it is desired that the product exhibit, in the zone of the ends of the fibers, a lower mass per volume accompanied by a less strong bond, in exchange for loss of good thermal insulation, this can be achieved by high speed of removal moisture or organic solvent, e.g., by heating the applied bonding agent above its boiling point.

After the drying step has been completed, the sheath material can either remain on the glued-together fiber bundle or it can be removed. The fiber bundles can then be passed on to preparing their ends in a conventional manner. The use of the very fine filler not only ensures that all gussets are filled out but also is especially advantageous for the working of the end faces in the optical sense, since extremely fine particles are less likely to produce scratches or damage the end faces.

Fiber bundles manufactured in this way, for example from quartz components, are firmly bonded together and not only can be stressed up to about 600° C. but are very much cheaper than the hot-melt bonded fiber bundles which are stable up to 600° C. Additionally, a plurality of glued-together bundles, with or without sheath, singly or in combination with hot-melt bonded bundles, with or without sheath, can be joined into a larger fiber optic unit which is likewise bonded in high-temperature fashion, provided it has a suitable sheath material, for example high-temperature resistant metals, alloys of the metals, glasses, ceramics, etc.

The foregoing embodiments are merely exemplary and, as is apparent, a plurality of other embodiments are possible by combination of the possible high-temperature resistant, glued-together or hot-melt bonded fiber bundles with suitable sheath materials, and by their fixation with a correspondingly selected and adapted silica sol.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fiber optic unit comprising a bundle of a plurality of glass fibers bonded together by cavities filled with a water insoluble bonding agent, which bonding agent is crystallized or amorphous $SiO_2$ precipitated from a solid silica sol having an $SiO_2$ to alkali molar ratio content, calculated as $SiO_2:R_2O$ wherein R is an alkali metal, of less than 15:1.

2. A fiber optic unit according to claim 1, wherein the bonding agent contains alkali in a molar ratio of $SiO_2$ to $R_2O$ wherein the R is sodium and/or potassium of from 15:1 to 200:1.

3. A fiber optic unit according to claim 2, wherein the molar ratio of the $SiO_2$ to $R_2O$ is from 60:1 to 130:1.

4. A fiber optic unit according to claim 2, wherein the alkali is $Na_2O$.

5. A fiber optic unit comprising at least one glass fiber bonded to a sleeve surrounding the fiber by a water insoluble crystalline or amorphous $SiO_2$ bonding agent precipitated from a solid silica sol having an $SiO_2$ to alkali molar ratio content, calculated as $SiO_2:R_2O$ wherein R is an alkali metal, of less than 15:1.

6. A fiber optic unit according to claim 5, comprising a plurality of glass fibers bonded both to another and to the sleeve by the bonding agent.

7. A fiber optic unit according to claim 5, wherein alkali is absent from the silica sol.

8. A fiber optic unit according to claim 5, characterized in that the bonding agent is a silica sol produced by the hydrolysis of a silicon ester in an organic fluid.

9. A fiber optic unit according to claim 5, wherein the bonding agent contains an inorganic filler.

10. A fiber optic unit according to claim 9, wherein the filler is selected from the group consisting of one or more of borosilicate glass powder, quartz glass powder, aluminum oxide, and ceramic glass powder.

11. A fiber optic unit according to claim 5, comprising a plurality of bundles of glass fibers bonded together.

12. A fiber optic unit according to claim 11, wherein the bundles of glass fibers are bonded together by the hot-melt method.

13. A fiber optic unit according to claim 11, wherein the glass fibers in the bundles are bonded together by the bonding agent.

14. A fiber optic unit according to claim 13, wherein the bonding agent contains an inorganic filler.

15. A process for bonding together a plurality of glass fibers into a bundle with a bond resistant to both high temperature and to moisture, which comprises the steps of forming the fibers into a bundle, coating the external surfaces of the fibers with a liquid silica sol bonding agent containing a volatile liquid component, either before or after forming the glass fibers into a bundle, and then removing the volatile liquid component from the bonding agent on the glass fibers and hardening the bonding agent to an insoluble solid state, thereby bonding the glass fibers together.

16. A process according to claim 15, wherein the silical sol contains a filler selected from the group consisting of at least one of borosilicate glass powder, quartz glass powder, aluminum oxide and glass ceramic powder.

17. A process according to claim 16, wherein the filler is present in the silica sol in a weight ratio to the $SiO_2$ therein of from 1:1 to 24:1.

18. A process according to claim 17, wherein the ratio of filler to $SiO_2$ is from 1.9:1 to 9:1.

19. A process according to claim 15, wherein the liquid component is removed from the bonding agent by the application of a vacuum to a bundle of the coated glass fibers.

20. A process according to claim 19, wherein the liquid component is removed from the silica sol bonding agent by heating a bundle of the coated glass fibers.

21. A process according to claim 20, wherein the heating is by microwave energy.

22. A process according to claim 19, wherein withdrawal of the liquid component is removed with an extractant while in a supercritical state.

* * * * *